United States Patent
Harris et al.

(10) Patent No.: US 6,671,518 B2
(45) Date of Patent: Dec. 30, 2003

(54) METHOD AND APPARATUS FOR TRANSMITTING VOICE INFORMATION

(75) Inventors: John M. Harris, Chicago, IL (US); Tyler A. Brown, Mundelein, IL (US); Lee M. Proctor, Cary, IL (US); Robert D. Battin, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/295,123

(22) Filed: Nov. 15, 2002

(65) Prior Publication Data

US 2003/0105625 A1 Jun. 5, 2003

Related U.S. Application Data

(60) Provisional application No. 60/346,966, filed on Nov. 19, 2001.

(51) Int. Cl.[7] .................................................. H04B 7/00
(52) U.S. Cl. ........................ 455/518; 704/201; 704/221; 714/701; 714/752
(58) Field of Search ................................. 704/201, 221; 714/701, 752, 753, 755, 758; 370/335, 342; 455/518

(56) References Cited

U.S. PATENT DOCUMENTS 5,600,754 A * 2/1997 Gardner .................. 395/2.3
5,606,569 A 2/1997 MacDonald et al.
2003/0069017 A1 * 4/2003 Ahmed et al. ............... 455/434
2003/0101386 A1 * 5/2003 Brouet et al. ................ 714/704

FOREIGN PATENT DOCUMENTS

WO     WO 01/52467 A1    7/2001
WO     WO 01/86637 A1    11/2001

* cited by examiner

*Primary Examiner*—Lee Nguyen
(74) *Attorney, Agent, or Firm*—Steven A. May

(57) ABSTRACT

A typical radio frame (300) comprises A, B, and C vocoded bits (304). At the end of each frame (300) A and B bits (305) are inserted from a previous frame. Thus, each frame not only comprises A, B, and C bits (304) for that frame, but also comprises those A and B bits (305) originally transmitted in a prior frame. Thus, each frame comprises high and low priority vocoded bits (304) from the current vocoder frame, and those higher priority bits from a preceding frame (305). By placing an inner CRC (302, 303) around the most important bits of the vocoded frame, even though a frame is erased (e.g. its outer CRC (301) failed) it can still be verified that the most important bits in the vocoded frame are correct. Since the class B and C bits can tolerate some errors, the vocoded frame can then play out if its inner CRC passes.

13 Claims, 4 Drawing Sheets

METHOD AND APPARATUS FOR TRANSMITTING VOICE INFORMATION

REFERENCE(S) TO RELATED APPLICATION(S)

The present application claims priority from provisional application, Serial No. 60/346,966, entitled "METHOD AND APPARATUS FOR TRANSMITTING VOICE INFORMATION," filed Nov. 19, 2001, which is commonly owned and incorporated herein by reference in its entirety.

FIELD OF THE INVENTION

The present invention relates generally to transmitting voice information and in particular, to a method and apparatus for transmitting voice information within a communication system.

BACKGROUND OF THE INVENTION

Within cellular communication systems, voice quality is often perceived by the user as the most important attribute to any call. Cellular providers along with equipment manufacturers continuously strive to improve voice quality within cellular communication systems. A trade off in voice quality exists in that usually a higher quality voice channel requires more Radio Frequency (RF) capacity, limiting the total number of calls a system can simultaneously provide.

Recently it has been proposed to add dispatch capabilities to the cdma2000 system. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the dispatch individual (typically called a private call) call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch individual call service.

In addition to voice quality, low delay is also a critical factor in any dispatch call. For example delay that is acceptable for a typical interconnect voice call, can be unacceptable for dispatch services which rely on a very fast connection being made to the called party. Therefore, a need exists for a method and apparatus for transmitting voice information in a dispatch environment that provides acceptable voice quality, yet allows for fast interconnections required by dispatch users.

DETAILED DESCRIPTION OF THE DRAWINGS

Figure 1:
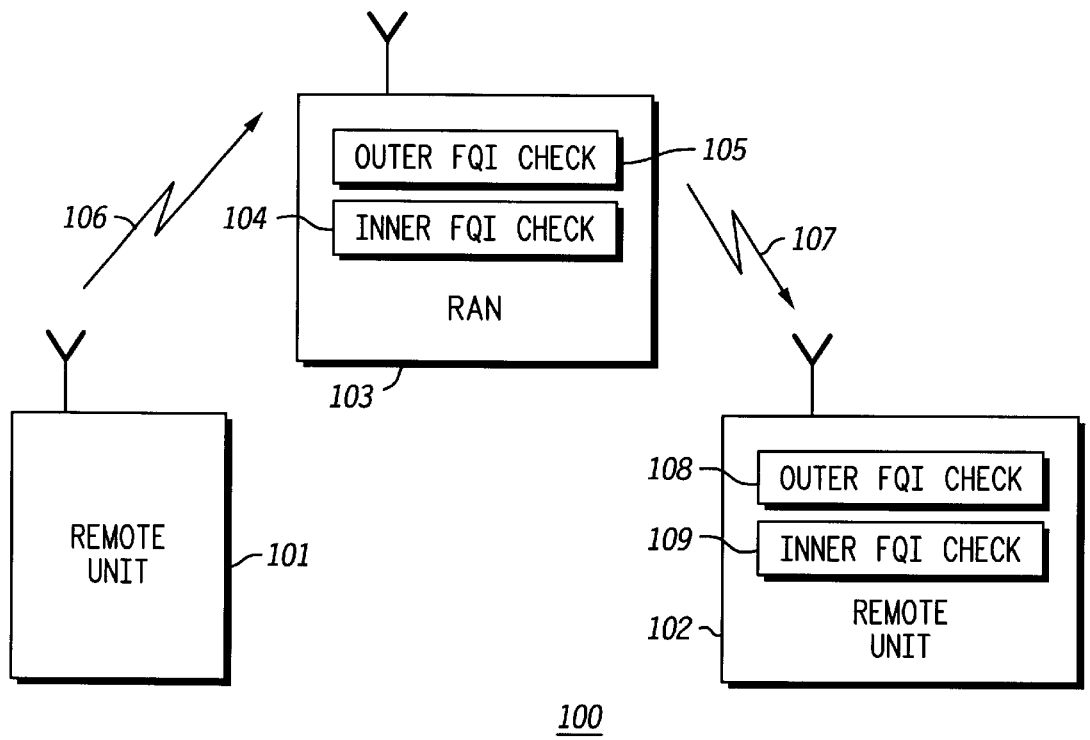
FIG. 1 is a block diagram of a communication system in accordance with the preferred embodiment of the present invention.

To address the above-mentioned need, a typical vocoder frame comprises A, B, and C vocoded bits. At the end of each radio frame A and B bits are inserted from a previous vocoder frame. Thus, each radio frame not only comprises A, B, and C bits for that vocoder frame, but also comprises those A and B bits originally transmitted in a prior radio frame. Thus, each radio frame comprises the entire current vocoded bits, and those higher priority bits from a preceding frame. By placing an inner CRC around the most important bits of the vocoded frame, even though a radio frame is erased (e.g. its outer CRC failed) it can still be verified that the most important bits in the vocoded frame are correct. Since the class B and C bits can tolerate some errors, the vocoded frame can then play out if its inner CRC passes.

This methodology has the benefit of significantly improving the error mitigation rate, and providing acceptable vocoder bit error rates in the vocoded frames themselves. For example, at a 10% FER, this scheme can result in good voice quality with a ~0.1% error mitigation rate, a 0.4% B bit BER, and a 2% C bit BER. If instead, no inner CRC was used, and no extra copy was used, then this would result in unacceptable voice quality with a ~10% error mitigation rate, a 0% B bit BER, and a 0% C bit BER.

The present invention encompasses a method for transmitting voice information, the method comprises the steps of outputting A, B, and C class bits from a vocoder, outputting A and B class bits from a prior vocoder frame, and assembling a frame comprising the A, B, and C bits output from the vocoder and the A and B class bits from the prior vocoder frame.

The present invention additionally encompasses an apparatus comprising a vocoder having voice as an input and outputting A, B, and C vocoder bits for a current frame, and a buffer outputting A and B vocoder bits for a prior frame. The apparatus additionally comprises a frame constructer outputting a frame comprising the A, B, and C vocoder bits for the current frame and the A and B vocoder bits for the prior frame.

The present invention additionally encompasses a method for receiving a frame. The method comprising the steps of receiving a frame comprising A, B, and C vocoder bits for the frame and additionally comprising A and B vocoder bits for a prior-received frame, and utilizing the A and B vocoder bits for the prior-received frame to construct a prior frame received in error.

The present invention additionally encompasses an apparatus comprising outer FQI checking circuitry having an outer FQI as an output, wherein the outer FQI represents a quality of a frame as a whole, first inner FQI checking circuitry having a first inner FQI as an output, wherein the first inner FQI represents a quality of class A and a portion of class B vocoder bits transmitted with the frame, and second inner FQI checking circuitry having a second inner FQI as an output, wherein the second inner FQI represents a quality of class A and a portion of Class B vocoder bits transmitted with the frame, and additionally transmitted in a prior frame.

Turning now to the drawings, wherein like numerals designate like components, FIG. 1 is a wireless communication system in accordance with the preferred embodiment of the present invention. In the preferred embodiment of the present invention, communication system 100 utilizes a Code Division Multiple Access (CDMA) system protocol as described in Cellular System Remote unit-Base Station Compatibility Standard of the Electronic Industry Association/Telecommunications Industry Association Interim Standard 2000 (IS2000), which is incorporated by reference herein. (EIA/TIA can be contacted at 2001 Pennsylvania Ave. NW Washington D.C. 20006). In alternate embodiments communication system 100 may utilize other cellular communication system protocols such as but not limited to the Global System for Mobile Communications (GSM) protocol, IS-136, IS-95, or IS-833.

Communication system 100 includes remote or mobile units 101 and 102, and Radio Access Network (RAN) 103. Mobile unit 101 includes the vocoder and mobile unit 102 includes the decoder. Mobile unit 102 comprises an outer Frame Quality Indicator (FQI) 108 and an inner FQI 109. RAN 103 comprises an outer Frame Quality Indicator (FQI) 104 and an inner FQI 105. Although not shown, RAN 103 comprises those network elements necessary for wireless communication with mobile units 101 and 102. All network elements are available from Motorola, Inc. (Motorola Inc. is located at 1301 East Algonquin Road, Schaumburg, Ill. 60196).

Operation of communication system 100 occurs as follows: As shown, remote unit 101 is communicating to RAN 103 via uplink communication signal 106, and RAN 103 is communicating to remote unit 102 via downlink communication signal 107. Communication system 100 may utilize a Radio Link Protocol (RLP) for the link layer to transport data or voice traffic between a mobile unit and infrastructure equipment. In particular, during typical interconnect transmission voice-encoded (vocoded) voice data is transmitted over the air. In the preferred embodiment of the present invention two voice encoders (vocoders) are typically utilized for over-the-air transmission of voice data, namely I6 and I12. More information on I6 and I12 vocoding can be found in VSELP 4200 BPS Voice Coding Algorithm for iDEN and iDEN RF Interface: Layer 2, both available from Motorola, Inc.

As described, each vocoded frame contains three classes of bits, in order of decreasing importance: class A, class B, and class C. If class A bits contain any bit errors, then the vocoded frame must be error mitigated, while the B an C bits can tolerate some bit errors. Table 1 illustrates I6 and I12 vocoding.

TABLE 1

I6 AND I12 vocoding

| Vocoder Type | Class A Bits | Class B Bits | Class C Bits | Total Bits | Period |
|---|---|---|---|---|---|
| I6 | 12 | 54 | 60 | 126 | 30 ms |
| I12 | 20 | 31 | 48 | 99 | 45 ms |

Figure 2:
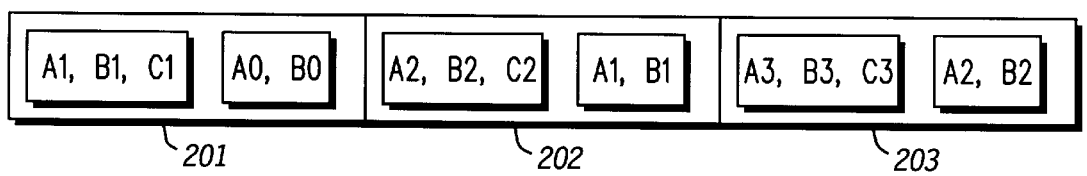
FIG. 2 illustrates a frame structure in accordance with the preferred embodiment of the present invention.

FIG. 2 shows a radio frame structure for vocoded voice in accordance with the preferred embodiment of the present invention. As shown radio frames 201–203 comprise A, B, and C vocoded bits, however, at the end of each radio frame A and B bits from a previous vocoder frame are inserted. For example, radio frame 202 not only comprises A, B, and C bits for that vocoder frame, but also comprises those A and B bits originally transmitted in radio frame 201. Thus, each radio frame comprises current and prior vocoded bits, and those prior bits from a preceding frame are the highest priority bits of that voice frame. Although FIG. 2 shows each radio frame comprising higher-priority bits from the immediately preceding radio frame, in an alternate embodiment of the present invention the higher priority bits may come from any prior radio frame. In this case, the higher priority bits will also comprise a frame sequence number for identification.

Figure 3:
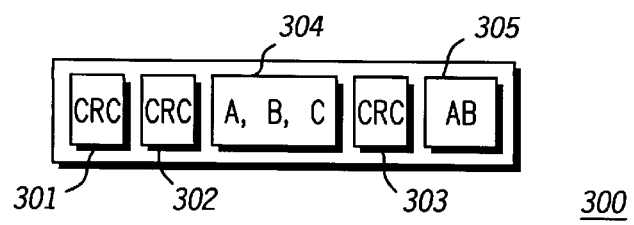
FIG. 3 is a more detailed view of a frame structure for vocoded voice in accordance with the preferred embodiment of the present invention.

FIG. 3 is a more detailed view of a radio frame structure for vocoded voice in accordance with the preferred embodiment of the present invention. As shown in FIG. 3, a plurality of Frame Quality Indicator (FQI) bits 301–303 (which in the preferred embodiment of the present invention are CRC bits) exist in frame 300. More particularly, a set of outer CRC bits 301 are utilized by a receiver to determine the error status of radio frame 300, while inner CRC bits 302–303 are utilized by the receiver to determine the error status of the A and some or all of the B, vocoder bits for the current vocoder frame, and the A and some or all of the B vocoder bits for a prior vocoder frame, respectively. Therefore, a receiver within communication system 100 can utilize the inner CRC to recover the originally transmitted A, B, and C bits or the retransmitted A and B bits even though the radio frame was erased.

Thus, by placing an inner CRC around the most important bits of the vocoded frame, even though a radio frame containing the vocoder frame is erased (e.g. its Outer CRC failed) it can still be verified that the most important bits in the vocoded frame are correct. Since the class B and C bits can tolerate some errors, the vocoded frame can then play out if its inner CRC passes.

Additionally, because each frame includes higher-priority vocoder bits from a previous frame, even if the inner CRC on the original copy of the vocoded frames most important bits indicates an error, the vocoded frame may still be recovered. If the inner CRC on $1^{st}$ copy fails, but the inner CRC on the extra copy passes, then the extra copy is combined with the lower priority bits of the 1$^{st}$ copy to create a complete vocoded frame.

This methodology has the benefit of significantly improving the error mitigation rate, and providing acceptable vocoder bit error rates in the vocoded frames themselves. For example, at a 10% FER, this scheme can result in good voice quality with a ~0.1% error mitigation rate, a 0.4% B bit BER, and a 2% C bit BER. If instead, no inner CRC was used, and no extra copy was used, then this would result in unacceptable voice quality with a ~10% error mitigation rate, a 0% B bit BER, and a 0% C bit BER.

Convolutional codes are used on the fundamental channel (e.g. FCH and DCCH) in CDMA 2000. Bit errors on convolutional codes tend to occur in clumps or groups. This scheme performs especially well, because the use of inner CRCs effectively isolate and eliminate the impact of bit errors, while recovering the adjacent bits when they are correct (not in a bit error clump).

By allowing the dispatch service to tolerate higher FERs, we reduce the RF impact of the dispatch calls, and improve the voice quality (BER & error mitigation rate). Additionally, because we are only spreading information between consecutive CDMA air frames, we are adding a minimum of extra delay. The extra delay added is on the order of 45 msecs to 30 msecs.

Figure 4:
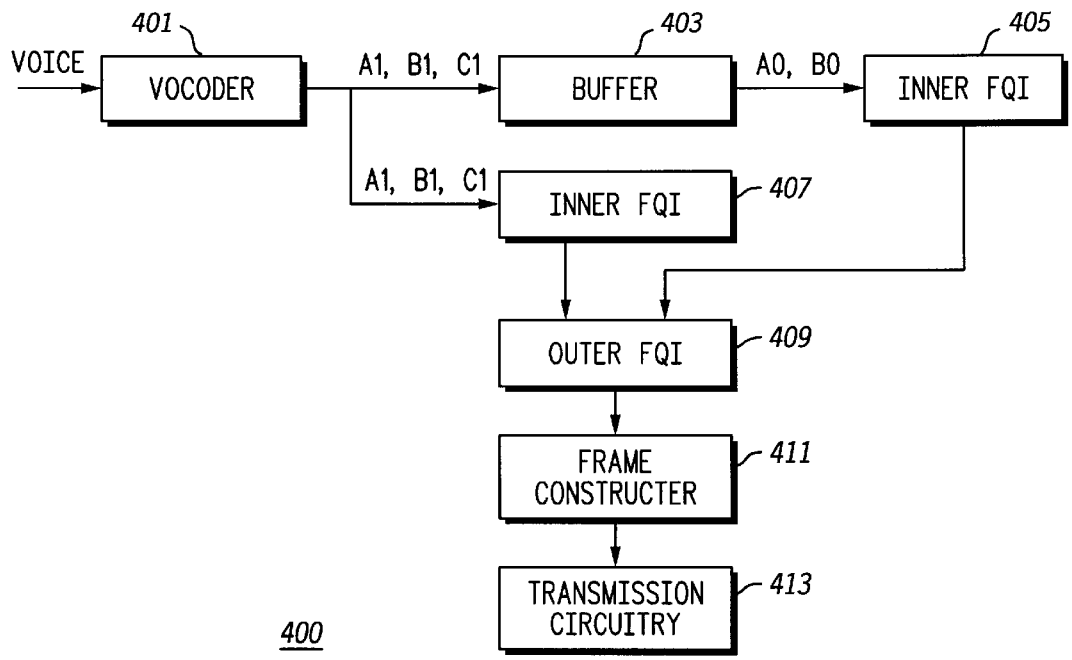
FIG. 4 is a block diagram of a transmitter in accordance with the preferred embodiment of the present invention.

FIG. 4 is a block diagram of a transmitter in accordance with the preferred embodiment of the present invention. As shown, transmitter 400 comprises vocoder 401, buffer 403, inner FQI 405, inner FQI 407, outer FQI 409, frame constructer 411, and transmission circuitry 413. During operation vocoder 401 receives a user's voice and outputs vocoded voice. As described above vocoded voice comprises sets of bits of varying importance. In the preferred embodiment of the present invention vocoded voice comprises A, B, and C bits as described above.

A, B, and C bits enter buffer 403 and inner FQI circuitry 407. Buffer 403 stores the current A and B bits and outputs A and B bits from a prior frame to inner FQI circuitry 405. Inner FQI circuitry 405 and Inner FQI circuitry 407 output A and B bits from a prior frame and A, B, and C bits from the current frame, respectively. Along with the A, B and A, B, and C bits, FQI circuitry 405, 407 outputs FQI bits along with vocoded bits. Outer FQI 409 constructs FQI bits for the whole frame and outputs A, B, and C bits for the current frame, A and B bits for a prior frame, inner FQI bits for the A, B, and C bits, inner FQI bits for the A and B bits, and FQI bits for the frame. Outer FQI bits represent a quality of the frame as a whole. Although the inner FQI bits represent quality information for the A, B, and C bits and the prior A and B bits, in an alternate embodiment both inner FQI bits will indicate the quality of the A and a portion of the B bits in order to reduce the likelihood of the CRC falsing. The same set of B bits (B bits 1–18 or such) will be covered in both inner CRCs. Frame constructer 411 constructs the frame as shown in FIG. 3 and outputs the frame to transmission circuitry 413.

Figure 5:
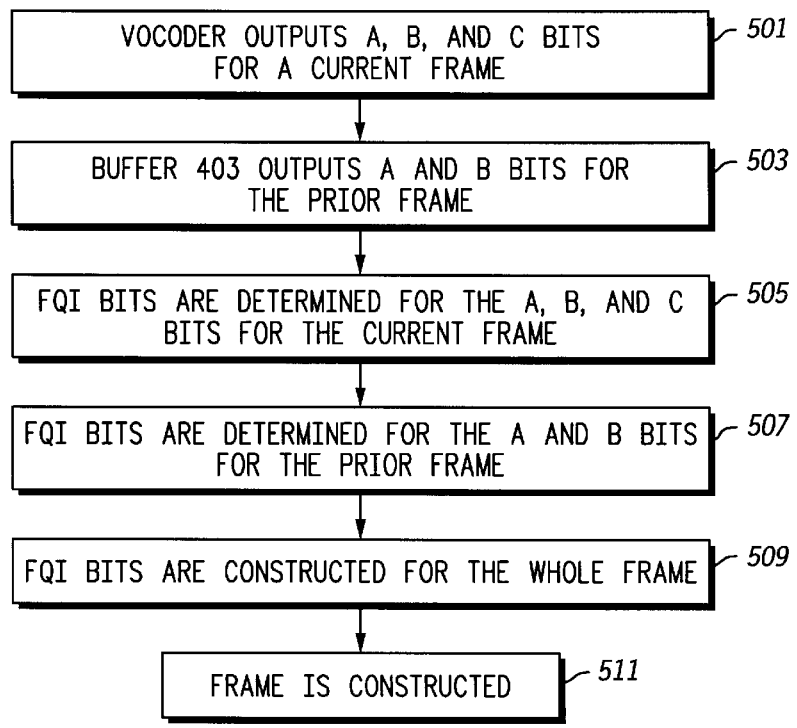
FIG. 5 is a flow chart showing operation of the transmitter of FIG. 4 in accordance with the preferred embodiment of the present invention.

FIG. 5 is a flow chart showing the operation of the transmitter of FIG. 4 in accordance with the preferred embodiment of the present invention. The logic flow begins at step 501 where a vocoder outputs A, B, and C bits for a current frame. At step 503 buffer 403 outputs A and B bits for a prior frame. At step 505 FQI bits are determined for the A, and a portion of the B bits for the current frame and at step 505 FQI bits are determined for the A and a portion of the B bits for the prior frame. (Alternatively at step 505 FQI bits are determined for the A, B, and C bits for the current frame and at step 505 FQI bits are determined for the A and the B bits for the prior frame). FQI bits are constructed for the whole frame (step 507) and the frame is constructed as shown in FIG. 3 (step 509).

Figure 6:
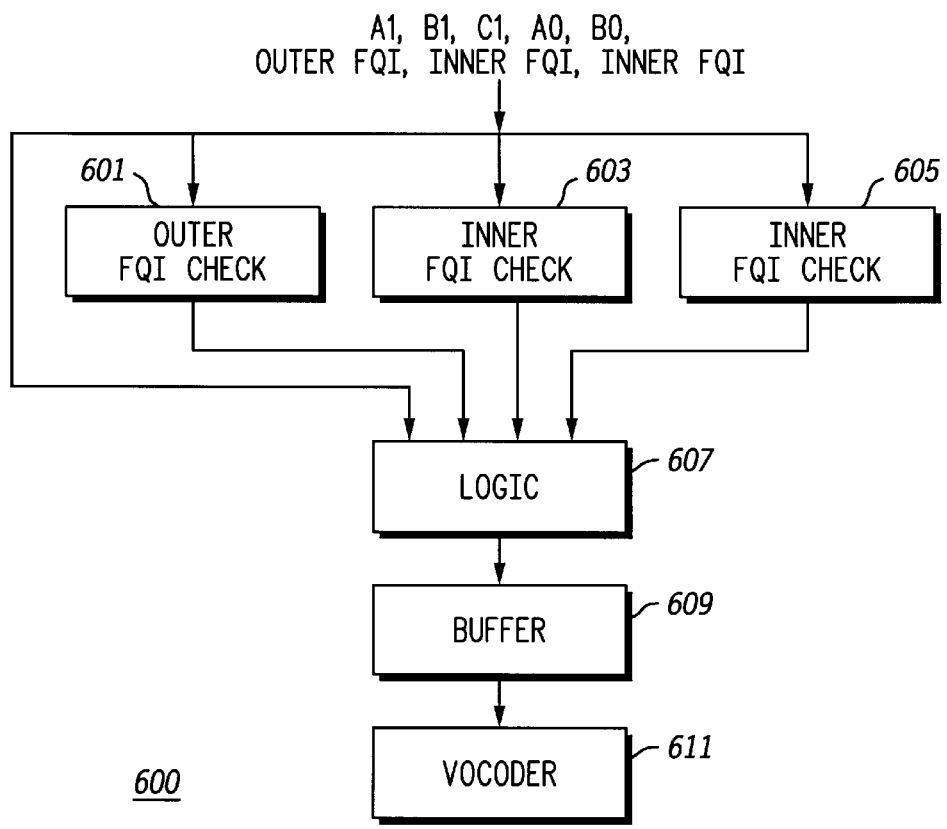
FIG. 6 is a block diagram of a receiver in accordance with the preferred embodiment of the present invention.
Figure 7:
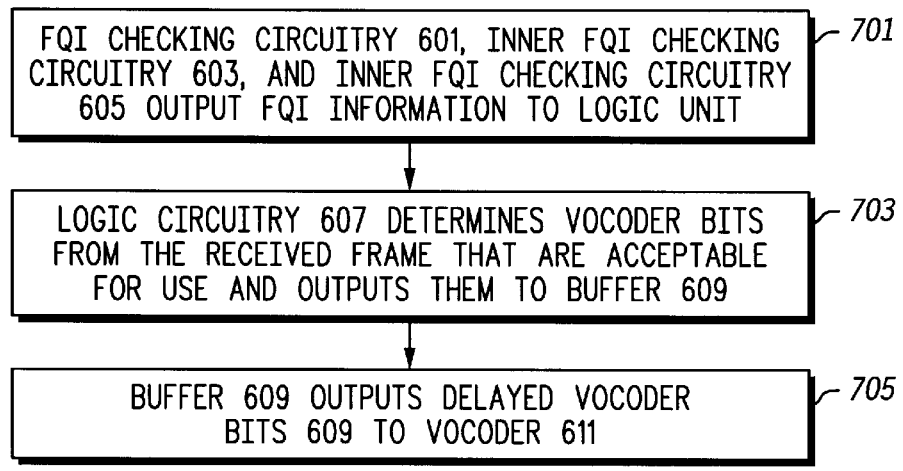
FIG. 7 is a flow chart showing operation of the receiver of FIG. 6 in accordance with the preferred embodiment of the present invention.

FIG. 6 is a block diagram of a receiver in accordance with the preferred embodiment of the present invention. As shown, receiver 600 comprises outer FQI checking circuitry 601, inner FQI checking circuitry 603 and 605, logic unit 607, buffer 609, and vocoder 611. Operation of receiver 600 in accordance with the preferred embodiment of the present invention occurs as shown in FIG. 7.

The logic flow begins at step 701 where outer FQI checking circuitry 601, Inner FQI checking circuitry 603, and Inner FQI checking circuitry 605 output FQI information to logic unit 607. As discussed above, in the preferred embodiment of the present invention FQI is preferably CRC information. Logic unit 607 also receives the received frame. At step 703 logic circuitry 607 determines vocoder bits from the received frame that are acceptable for use and outputs them to buffer 609. Buffer 609 outputs delayed vocoder bits to vocoder 611 (step 705). In particular, at step 705 to reconstruct the vocoded frame for play out, a playout buffer depth of approximately 45 msecs for I12, and 30 msecs for I6. In this way, when we have both the original copy and extra copy of a vocoded frame, we can then attempt to reconstruct that fame.

Figure 8:
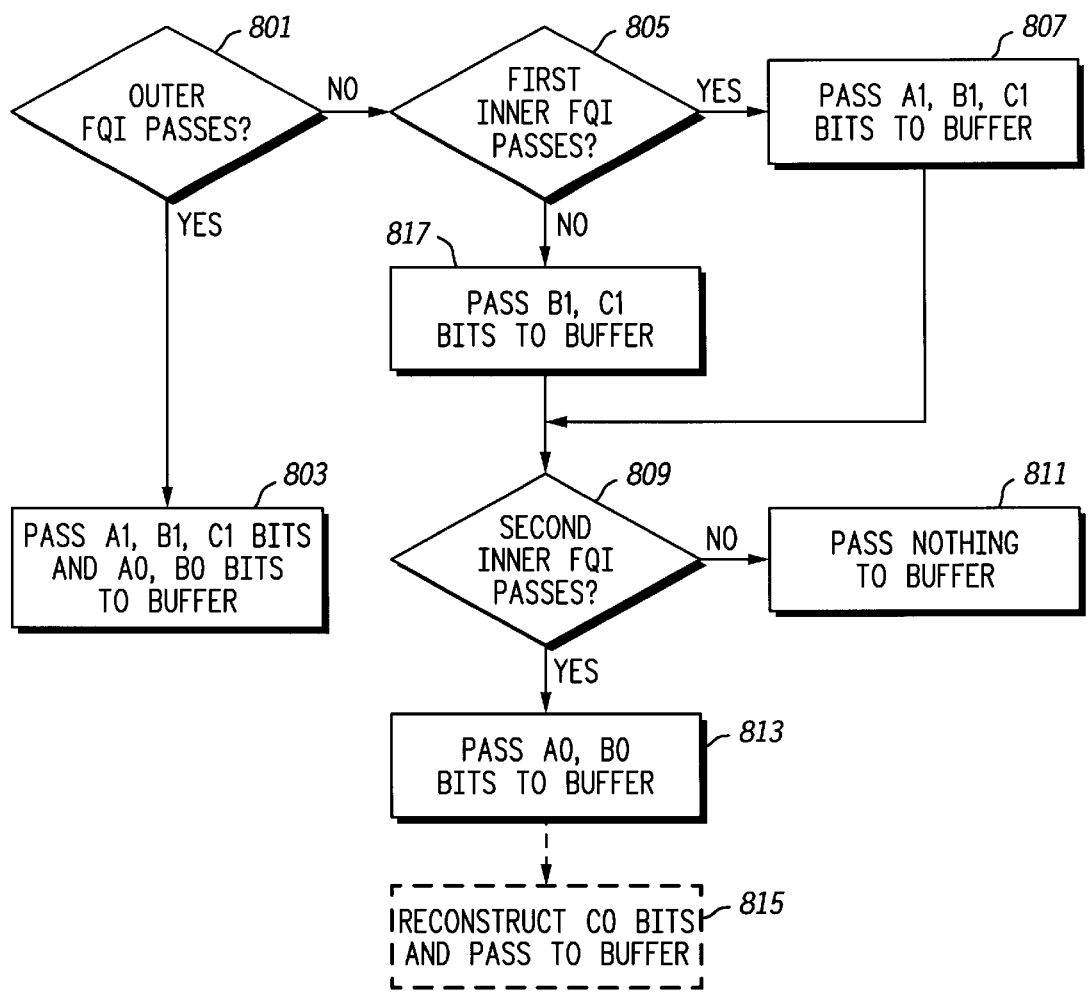
FIG. 8 is a flow chart showing operation of the logic unit of FIG. 7 in accordance with the preferred embodiment of the present invention.

FIG. 8 is a flow chart showing operation of logic unit 607 in accordance with the preferred embodiment of the present invention. The logic flow begins at step 801 where logic unit 607 determines if the outer FQI passes, and if so all vocoder bits within the frame are passed to buffer 609 (step 803). If the outer FQI does not pass then a determination is made as to whether the first inner FQI passes (step 805). As discussed above, the first inner FQI represents those vocoder bits (A, and a portion of B) that have not been transmitted in a prior frame. If it is determined that the first inner FQI passes then the logic flow continues to step 807 where the A, B, and C vocoder bits that have not been transmitted in a prior frame are passed to buffer 609. The logic then continues at step 809. If it is determined that the first inner FQI fails (step 805) then the B and C vocoder bits that have not been transmitted in a prior frame are passed to buffer 609 (step 817). At step 809 logic unit 607 determines if the second inner FQI passes, and if so, the logic flow continues to step 813 where the A and B bits that were transmitted in a prior frame are passed to buffer 609, otherwise nothing is passed (step 811).

In an alternate embodiment of the present invention, C bits transmitted from a prior frame are reconstructed and passed to buffer 609. Therefore, if the extra copy of A and B bits pass the FQI test, then class C bits are reconstructed and passes to buffer 609. In particular, because each frame includes higher-priority vocoder bits from a previous frame, even if the inner CRC on the original copy of the vocoded frames most important bits indicates an error, the vocoded frame may still be recovered. If the inner CRC on 1$^{st}$ copy fails, but the inner CRC on the extra copy passes, the extra copy can be combined with the lower priority bits after the 1$^{st}$ copy to create a complete vocoded frame.

While the invention has been particularly shown and described with reference to a particular embodiment, it will be understood by those skilled in the art that various changes in form and details may be made therein without departing from the spirit and scope of the invention. For example, although the preferred embodiment utilizes CRC bits as FQI bits, one of ordinary skill in the art will recognize that any FQI metric may be utilized instead of CRC bits. It is intended that such changes come within the scope of the following claims.

What is claimed is:

1. A method for transmitting voice information, the method comprising the steps of:
    outputting A, B, and C class bits from a vocoder, wherein the A, B, and C class bits are vocoder bits of varying importance;
    outputting A and B class bits from a prior vocoder frame; and
    assembling a frame comprising the A, B, and C bits output from the vocoder and the A and B class bits from the prior vocoder frame.

2. The method of claim 1 further comprising the steps of:
    calculating an outer Frame Quality Indicator (FQI) representing a quality of the frame as a whole; and
    calculating an inner FQI representing a quality of the A, and a portion of the B bits output from the vocoder.

3. The method of claim 2 further comprising the steps of:
    calculating a second inner FQI representing a quality of the A and a portion of the B class bits from the prior vocoded frame; and
    assembling the frame comprising the A, B, and C bits output from the vocoder and the A and B class bits from the prior vocoder frame, the outer FQI, the inner FQI, and the second inner FQI.

4. The method of claim 1 further comprising the steps of:
    calculating an outer Frame Quality Indicator (FQI) representing a quality of the frame as a whole; and
    calculating an inner FQI representing a quality of the A, B, and C bits output from the vocoder.

5. The method of claim 4 further comprising the steps of:
    calculating a second inner FQI representing a quality of the A and B class bits from the prior vocoded frame; and
    assembling the frame comprising the A, B, and C bits output from the vocoder and the A and B class bits from the prior vocoder frame, the outer FQI, the inner FQI, and the second inner FQI.

6. An apparatus comprising:
    a vocoder having voice as an input and outputting A, B, and C vocoder bits for a current frame;
    a buffer outputting A and B vocoder bits for a prior frame;
    a frame constructer outputting a frame comprising the A, B, and C vocoder bits for the current frame and the A and B vocoder bits for the prior frame, wherein the A, B, and C class bits are vocoder bits of varying importance.

7. The apparatus of claim 6 further comprising:
    first inner Frame Quality Indicator (FQI) circuitry outputting FQI information for the A and a portion of the B vocoder bits for the current frame;
    second inner FQI circuitry outputting FQI information for the A and a portion of the B vocoder bits for the prior frame;
    outer FQI circuitry outputting FQI information for the frame as a whole; and
    the frame constructer outputting the frame comprising the A, B, and C vocoder bits for the current frame and the A and B vocoder bits for the prior frame, the first inner FQI, the second inner FQI, and the outer FQI.

8. A method for receiving a frame, the method comprising the steps of:
    receiving a frame comprising A, B, and C vocoder bits for the frame and additionally comprising A and B vocoder bits for a prior-received frame, wherein the A, B, and C class bits are vocoder bits of varying importance; and
    utilizing the A and B vocoder bits for the prior-received frame to construct a prior frame received in error.

9. The method of claim 8 further comprising the steps of:
    receiving an outer Frame Quality Indicator (FQI) representing a quality of the frame as a whole;
    receiving a first inner FQI representing a quality of the A and a portion of the B vocoder bits for the frame; and
    receiving a second inner FQI representing a quality of the A and a portion of the B vocoder bits for the prior frame.

10. The method of claim 9 further comprising the steps of:
    determining if the outer FQI passes;
    determining if the first inner FQI passes; and
    determining if the second inner FQI passes.

11. The method of claim 10 further comprising the steps of:
    passing vocoder bits to a buffer based upon the steps of determining if the outer FQI passes, determining if the first inner FQI passes, and determining if the second inner FQI passes.

12. An apparatus comprising:
    outer FQI checking circuitry having an outer FQI as an output, wherein the outer FQI represents a quality of a frame as a whole;
    first inner FQI checking circuitry having a first inner FQI as an output, wherein the first inner FQI represents a quality of class A and a portion of class B vocoder bits transmitted with the frame; and
    second inner FQI checking circuitry having a second inner FQI as an output, wherein the second inner FQI represents a quality of class A and a portion of Class B vocoder bits transmitted with the frame, and additionally transmitted in a prior frame, wherein the A, and B class bits are vocoder bits of varying importance.

13. The apparatus of claim 12 further comprising:
    a logic unit having the frame, the outer FQI, the first inner FQI, and the second inner FQI as an input and outputting class A, B, and C bits based on the outer FQI, the first inner FQI, and the second inner FQI.

* * * * *